Oct. 13, 1942.    D. R. GILES    2,298,692
SIGNAL
Filed Jan. 13, 1940    2 Sheets-Sheet 1
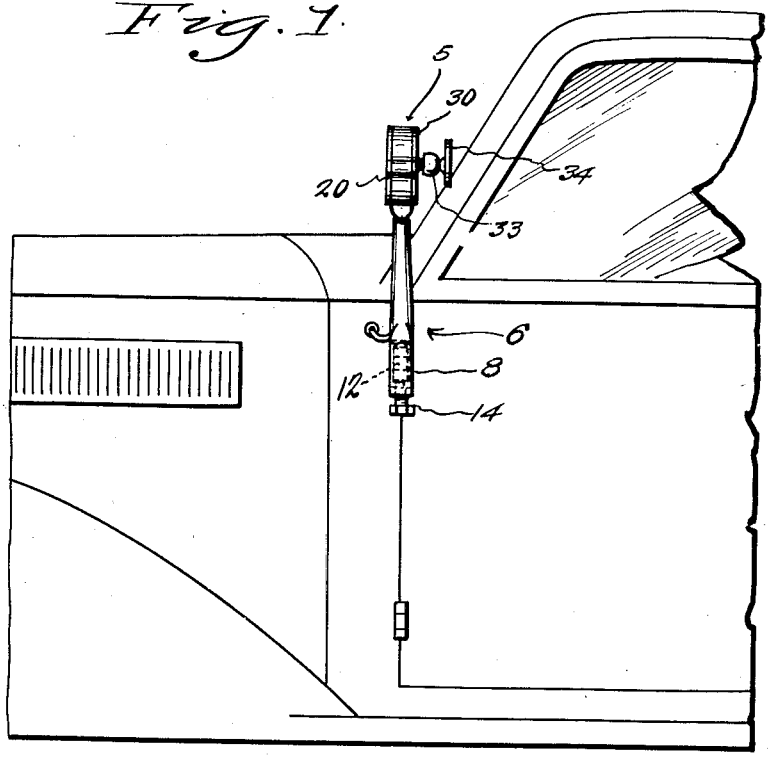
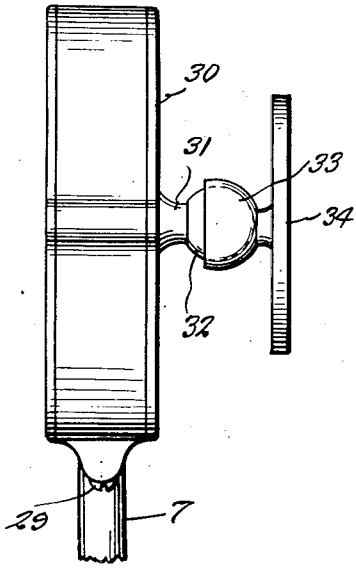
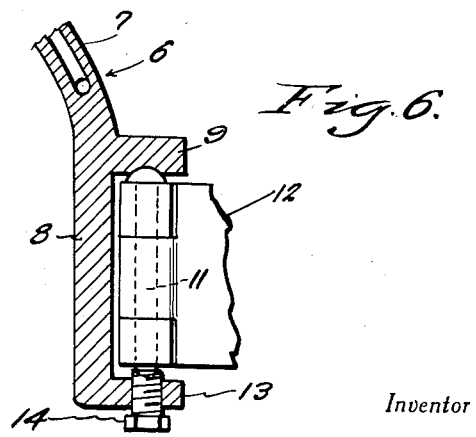
Inventor
Detroy Robert Giles
By Clarence A. O'Brien
and Hyman Berman
Attorneys

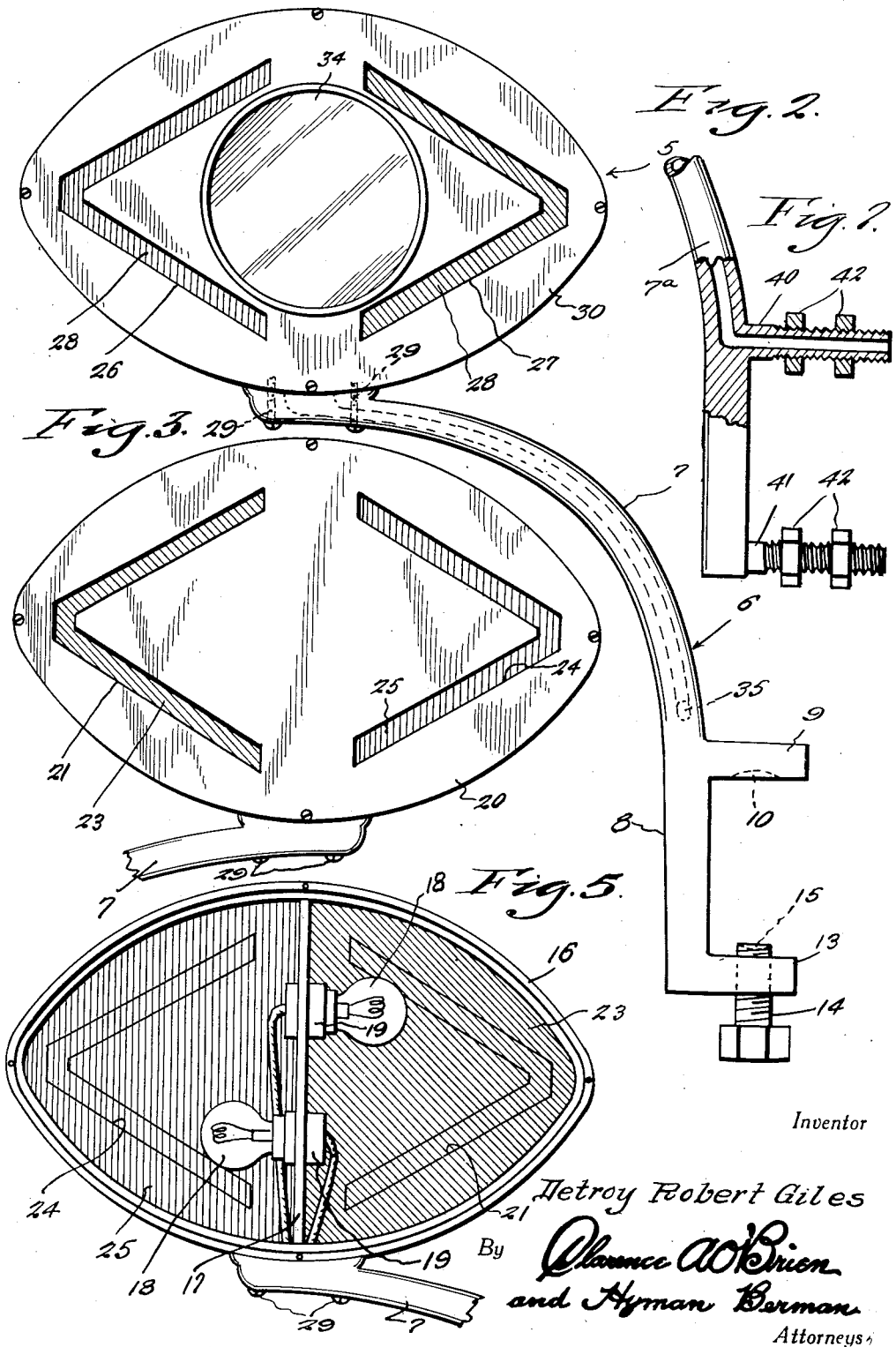

Patented Oct. 13, 1942

2,298,692

UNITED STATES PATENT OFFICE 2,298,692

SIGNAL

Detroy Robert Giles, Kansas City, Kans.

Application January 13, 1940, Serial No. 313,792

2 Claims. (Cl. 248—205)

This invention appertains to new and useful improvements in direction signals for automobiles.

The principal object of the present invention is to provide a direction signal which can be easily mounted and which will be visible over a much greater range than present day direction signals now in general use.

Still another important object of the invention is to provide a signal structure which incorporates a rear vision mirror, the latter without interfering with the visibility of the signal means.

Other objects and advantages of the invention will become apparent to the reader of the following specification.

In the drawings:

Figure 1 represents a fragmentary side elevational view of an automobile equipped with the novel signal means.

Figure 2 is a rear elevational view of the signal means.

Figure 3 is a front elevational view of the signal box.

Figure 4 is a side elevational view.

Figure 5 is a rear elevational view with the rear wall and mirror removed.

Figure 6 is a fragmentary detailed sectional view through the hinge pin clamp.

Figure 7 is a side elevation with a portion in section, fragmentarily showing the supporting arm and a modified form of connection to automobile bodies.

Referring to the drawings wherein like numerals designate like parts, it can be seen that numeral 5 generally refers to the signal lamp box, while numeral 6 generally refers to the support therefor. The support consists of the arcuate-shaped hollow arm 7 terminating in the laterally disposed U-shaped formation 8 which defines a clamp. The upper horizontal leg 9 has the recess 10 therein for receiving the upper end of the hinge pin 11 of a door hinge 12 as shown in Figure 6, while the lower leg 13 has the clamp screw 14 feedable in a direction upwardly therethrough and the upper end of this screw is concaved as at 15 to receive the lower end of the pin 11.

The lamp box 5 can be of ovate shape as suggested in Figure 5 and this box is denoted by numeral 16. The box has the vertical centrally located partition 17 therein, with a bulb and socket 18—19 on each side thereof.

On the front side of the box 16 is the plate 20 having the oppositely pointed V-shaped cut-outs 21 and 24 situated over the different colored windows 23—25.

The rear side plate has the oppositely disposed V-shaped cut-outs 26 and 27 therein located over the different colored window sections 28.

The box 16 sets upon the upper horizontally disposed portion of the post 7 and is secured in place as at 29.

Extending rearwardly from the central portion of the cover plate 30 is the shank 31 terminating in the ball 32 which is received by the socket 33 on the back of the mirror 34. This mirror 34 is preferably of circular shape and is of a size which will be confined within the area afforded by the V-shaped cut outs 26 and 27. (See Figure 2.) Thus it can be seen that the mirror will not interfere with visibility of the windows 26 and 27. The V-shaped cut-outs 26 and 27 will be visible at all times beyond the periphery of the mirror 34.

Obviously the post 7 is hollow so that conductors from the lamp sockets 19 can be brought downwardly and out through the opening 35 in the lower portion of the post as suggested in Figure 1.

Some forms of automobile bodies may not be equipped with hinged ends which will permit the use of the present signal structure thereon, and in such instances, the form of connection shown in Figure 7 may be employed. In this form, the arm 7a is equipped with a pair of laterally extending members 40 and 41, the latter being solid and equipped with nuts 42, while the upper member 40 is hollow and in communication with the duct through the arm 7a so that the conductors from the lamp sockets in the signal box can be trained therethrough to the interior of the vehicle. The upper member 40 is equipped with nuts 42, one of which will be against the outside of the vehicle body while the other will be against the inside in properly supporting the arm 7a in useful position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A support for electrical utilities comprising a vertically disposed arm provided with a horizontally curved utility supporting upper end portion, a pair of vertically spaced and horizontally disposed supporting structure attachable projections at the lower portion of the arm, said arm being hollow from its upper end to the uppermost supporting structure attachable projection to define an electric conductor passageway, the upper projection being hollow in continuation of said passageway, said projections being provided with threads and nuts thereon.

2. A support of the character described comprising a U-shaped formation having its legs horizontally disposed, an upwardly and outwardly curved arm of hollow construction and adapted to support an object at the upper end thereof, said U-shaped structure being provided with detent means associated with its leg portions for attaching the leg portions to a supporting structure, the uppermost leg portion being hollow in continuation of the passageway through the curved arm.

DETROY ROBERT GILES.